United States Patent Office 3,156,672
Patented Nov. 10, 1964

3,156,672
LINEAR POLYUREAS PREPARED FROM HALF-POLYMERS
Gerrit Johann Meine van der Kerk, Utrecht, Netherlands, assignor to Nederlandse Organisatie voor Toegepast-Natuurwetenschappelijk, Onderzoek ten behoeve van Nijverheid, Handel en Verkeer, The Hague, Netherlands, a corporation of the Netherlands
No Drawing. Filed May 10, 1960, Ser. No. 28,007
Claims priority, application Netherlands, May 11, 1959, 239,046
4 Claims. (Cl. 260—77.5)

The present invention relates to a process for the preparation of stabilized linear polyureas.

Linear polyalkylene ureas can be obtained in various known ways, starting from an alpha-omega diamine. Known are for instance the preparations from phosgene with a diamine, from a carbonic ester with a diamine, from $CO_2$ with a diamine (under high pressure) and from COS with a diamine.

In this manner polyalkylene ureas can be obtained having approximately the following general formula

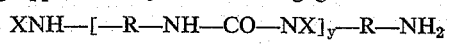

$$XNH-[-R-NH-CO-NX]_y-R-NH_2$$

in which R represents a linear or cyclic radical having at least 4 carbon atoms, and X a hydrogen or an aliphatic radical having from 1 to 4 carbon atoms, and y represents a degree of polymerization, which for the final polymer may amount to about from 40 to 70. In this process, the starting products may contain mixtures of different diamines. In certain cases, a minor quantity of monoamine is added to the reaction mass, with a view to adjusting the chain length, either before or during the condensation reaction.

If certain reaction circumstances are changed, such as the relative proportions of the starting products, linear polyureas are obtained having approximately the same chemical formula as stated above and a degree of polymerization y amounting to about 10 to 30. Said polymers of medium molecular weight (about 1500 to 5000) show no fiber forming properties and are hereinafter called half-polymers.

In the reaction cycle starting from diamine and COS, an amino alkylene monothiocarbamic salt is obtained, which is converted into a substantially sulphur-free half-polymer by heating it in the solid state at temperatures below 150° C., which half-polymer can be converted into the final alkylene urea polymer having fibre forming properties by prolonged heating below the melting point either in vacuum or in an atmosphere which contains COS gas.

The linear polyalkylene ureas obtained with any of the said prior art processes are readily spinnable and/or compressible products having favourable electrical and mechanical properties, particularly with respect to the stability against acid and alkaline hydrolysis. However, the thermostability of these products above the melting point is rather insufficient. When heated during an hour at temperatures of about 20° C. above the melting point the spinnability shows a marked decrease, which is also evident from the decrease in viscosity, which is caused by a decrease in molecular weight. This bad thermostability presents a drawback in the industrial working up into spun threads or into granules.

An object of the invention is to provide a process to produce fibre forming high molecular weight polyalkylene ureas which show an improved thermostability.

Another object of the invention is to provide a process to produce thermostable fibre-forming high molecular weight polyalkylene urea from polyalkylene urea of medium molecular weight.

Other objects of the invention appear from the description below.

The invention mainly consists in that high molecular weight linear polyalkylene ureas of improved thermostability are obtained when a mixture of a half-polymer as defined above and an approximately equivalent quantity of urea, cyanuric acid, or an ureide having two free $NH_2-$ groups is heated at temperatures of 10 to 20° centigrade above the melting point until a polymer of a sufficiently high molecular weight is obtained.

In general 0.3 to 1.7 mols and preferably 0.5 to 1.3 mols of urea or of the related products stated above are added per mol of the half-polymer. Examples of ureides having two free $NH_2-$ groups, which may be used in the present reaction are: biuret and alkylene or arylene diureas such as hexamethylene diurea, p-phenylene-diurea, p,p'-dicyclo-hexylmethane diurea and piperazyl diurea.

The equivalent quantity of the half-polymer is determined by a titration of the free $NH_2-$ groups assuming that each molecule of the half-polymer contains two free $NH_2-$ groups.

In the reaction with urea or one of the said ureides, ammonia is evolved.

When urea is reacted ammonia is evolved.

The obtained polymer can be heated as melt in a closed vessel during several hours, without there being any sign either of degraduation or of continued polymerization. Also, from said melt threads can be spun or objects can be formed, for instance with the aid of an extrusion press.

A polymer, obtained from such a melt by cooling, may yet present difficulties when it is being remelted because in that case a further increase of viscosity and consequently a further rise in the molecular weight is brought about, whilst in addition to this, when a vacuum is applied to the melt, gas is evolved and bubbles are formed, which are very difficult to remove from the tough-melt.

Therefore, the treatment according to the invention is advantageously combined with the addition of small quantities of monoamine.

In connection with the volatility of the lower amines at the melting point of the polymer preferably alkylmonoamine having a carbon chain of at least 7 C-atoms, is added, such as n-heptylamine, n-octylamine, n-decylamine, n-dodecylamine, n-octadecylamine, di-hexylamine etc.

It is also possible to replace the monoamine by a mono- or di-alkylated urea derivative or a mono- or dialkylbiuret.

When a half-polymer is melted together with urea or with one of the above-mentioned ureides, and with a monoamine or a monoalkyl urea, a high molecular weight melt, which is also stable in vacuum is obtained by heating for about an hour at atmospheric pressure and then in vacuum.

If a solid polymer, obtained from such a melt by cooling, is remelted, the viscosity of said polymer hardly shows any shifting of the viscosity, in contradistinction to the polyalkylene ureas prepared according to the prior art processes.

The product which is to be prepared according to the invention has the same favourable qualities as the known polyureas: low water-absorption, low permeability to water vapour, low dielectrical losses, good mechanical properties and high stability against hydrolysis. The products obtained are readily soluble in the known polyurea solvents such as concentrated sulphuric acid and phenol.

Possible starting products for the half-polymers are for example octa-, nona-, deca-, and dodecamethylene diamine and mixtures of same with lower diamines such as for instance a mixture of one of the above-mentioned amines with hexamethylene diamine. It is also possible to use mono N-alkyl derivatives.

It is observed that, where in this specification mention is made of (solution) viscosity, the intrinsic viscosity of a solution of the product in concentrated sulphuric acid (95.0%) measured at 25° C. in an Ubbelhode viscosimeter, is meant.

EXAMPLE I 0.5% by weight and 1% by weight respectively of urea are added to two quantities of a half-polymer obtained in the manner indicated below, and having a melting point of about 210° C. and an intrinsic viscosity of 0.34.

The masses are melted while stirring and subsequently heated at a temperature of 230° C.

The course of the intrinsic viscosity with the heating time is shown in the following table.

| Time (hours) | Intrinsic viscosity | |
|---|---|---|
| | With 1% | ½% urea |
| 0 | 0.34 | 0.34 |
| 1 | 0.53 | 0.44 |
| 2 | 0.54 | 0.43 |
| 3 | 0.53 | 0.45 |

The melting point of the end product was 210–215° C.

It is observed that without the addition of urea the viscosity value of 0.5 in the condensation reaction of the half-polymer when heated under decreased pressure and below the melting point is not reached until after 15 hours. Consequently the process according to the present application brings about a marked acceleration of the reaction as compared with the heating of the powdered solid.

The product obtained according to the above process could be spun into a drawable thread and could be extruded for instance so as to form a band; a moulding powder obtained therefrom was formed into a flexible and substantially colourless sheet in a heated press.

Preparation of the Half-Polymer

Gaseous COS is introduced into a 10% alcoholic solution of nonamethylene diamine until it ceases being taken up. The reaction heat is removed by cooling. The aminoalkylene thiocarbamic salt which is separated is filtered and after being rinsed with alcohol it is dried in vacuum.

The yield is quantitative.

The conversion of the thiocarbamic salt into the half-polymer is effected by heating under reduced pressure (1 to 2 cm. of mercury) for 2 hours at 80° C. followed by two hours at 100° C. and 2 hours at 120° C. and, finally by 3 to 4 hours at 120° C. in high vacuum (below 1 mm. of mercury).

EXAMPLE II

In a manner analogous to that of Example I but starting from decamethylene diamine, a polyalkylene urea half-polymer is prepared having a melting point of 230° C. and a viscosity of 0.28.

The heating of said polymer in the melt for 1 hour at 254° C., with various quantities of urea added, yielded the following data.

| Addition, percent | 0 | ½ | 1 | 3 |
|---|---|---|---|---|
| Viscosity after 1 hour at 254° C. | 0.28 | 0.34 | 0.39–0.40 | 0.40–0.41 |

When the end product was obtained by heating for 15 hours at 180° to 190° C. in the solid state without any additions, and this product was melted for 1 hour at 254° C., then the viscosity dropped from the initial value of 0.45 as far as below 0.30.

EXAMPLE III

A polyalkylene urea half-polymer having a melting point of 230° C., an intrinsic viscosity of 0.24 and a molecular weight of 2700 is prepared, starting from decamethylene diamine. After heating said half-polymer in molten condition with 2.2% by weight of urea at 254° C. during 2 hours, a viscosity of from 0.39 to 0.40 is reached and the product is spinnable into a thread.

When melting said same half-polymer, without any additions, during 2 hours at 254° C., the viscosity had remained 0.24.

If the high molecular polyurea is obtained by heating the said half-polymer during 15 hours at temperatures of from 180 to 190° C. in vacuum in the solid state without any additions, and the product obtained is melted during 1 hour at 254° C. while blanketing with nitrogen, the viscosity sinks from a starting value of 0.45 to below 0.30, during which process the original fibre-forming properties completely disappear.

EXAMPLE IV

A mixture of 116 g. of hexamethylene diamine (1 mol), 172 g. of decamethylene diamine (1 mol) and 114 g. of urea (nearly 2 mols) is placed in a reaction vessel, provided with means for introducing nitrogen gas. While introducing nitrogen and agitating the reaction mass (by vibration) the temperature is raised to 140° C. and subsequently gradually raised to 40° C. over a period of two hours.

A sample of the reaction mass is taken, the molecular weight of the half-polymer thus obtained is determined by means of titration of the amino end groups (0.464 milliequivalent per gram of half-polymer) and is found to amount to about 4300.

Subsequently, a mixture of 3 g. of urea and 9.3 g. of decylurea is added to the reaction mass (0.71 mol and 0.67 mol respectively per mol of half-polymer). The mass is then melted and heated during 1 hour at 220° C. while passing through nitrogen at atmospheric pressure and then during another hour under reduced pressure (about 12 mm. Hg). The melt obtained has an intrinsic viscosity of 0.45, which after another hour of heating under nitrogen at the same temperature has not changed.

The product, which has fibre forming properties, is pressed into a substantially colourless band, which, after cooling, is broken into small granules.

The granules are remelted at the air (melting point about 195° C.) and heated during 1 hour at 220° C.

The relative viscosity now is 0.46 i.e. practically unchanged.

EXAMPLE V 200 g. of the half-polymer obtained as described in Example IV are mixed in a reaction vessel with 3.7 g. of urea and 4.85 g. of decylamine and treated as described in Example IV.

The intrinsic viscosity of the product is 0.46.

After reheating a sample of the high-polymeric product for one hour at 230° C., the viscosity is 0.44.

EXAMPLE VI

The reaction of Example V is repeated with 200 g. of half-polymer, 3.7 g. of urea and 8.30 of octadecylurea.

The intrinsic viscosity of the product is 0.43.

After reheating a sample of the polyurea product for one hour at 230° C. the viscosity amounts to 0.44.

EXAMPLE VII 20 g. of alkylene urea half-polymer having a molecular weight of 2100 is heated with 1.53 g. of hexamethylene diurea and 0.76 g. of decylurea at a temperature of 230° C. for one hour, while blanketing with nitrogen and then for another hour in a vacuum of about one cm. Hg. The intrinsic viscosity of the product obtained is 0.54.

After reheating the product for one hour at a temperature of 230° C. in an open vessel, the viscosity is 0.50, and after two hours at 230° C. it is 0.49. The product has excellent fiber forming properties.

I claim:

1. A process for the preparation of stabilized linear polyalkylene ureas which comprises heating a half-polymer with a molecular weight between about 1200 and 5000 and having the formula

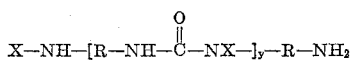

wherein R is selected from the group consisting of aliphatic and cyclo aliphatic radicals having 4 to 12 carbon atoms, X is selected from the group consisting of hydrogen and aliphatic radicals having 1 to 4 carbon atoms and $y$ is an integer from 10 to 30 at a temperature from 10 to 20° C. above the melting point of the half-polymer in the presence of 0.3 to 1.7 mols of a urea compound selected from the group consisting of urea, cyanuric acid and an ureide having two free —$NH_2$ groups per mol of half-polymer until a polyalkylene urea of sufficiently high viscosity is obtained.

2. The process of claim 1 wherein 0.5 to 1.5 mols of a compound selected from the group consisting of a mono alkyl amine having 7 to 20 carbon atoms and its mono- and di-urea and -biuret derivatives is added per mol of the urea compound added to the half-polymer.

3. The process of claim 1 wherein the amount of urea compound is 0.5 to 1.3 mols.

4. A stable linear polyalkylene urea produced by the process of claim 2.

References Cited in the file of this patent
UNITED STATES PATENTS

| | | |
|---|---|---|
| 2,145,242 | Arnold | Jan. 31, 1939 |
| 2,583,370 | Goppel et al. | Jan. 22, 1952 |
| 2,830,037 | Carter | Apr. 8, 1958 |
| 2,843,568 | Benning et al. | July 15, 1958 |
| 2,877,193 | Roussel | Mar. 10, 1959 |
| 2,894,933 | Schweitzer | July 14, 1959 |
| 2,973,342 | Inaba | Feb. 28, 1961 |

OTHER REFERENCES

Ser. No. 383,040, Moldenhaur (A.P.C.), published Apr. 20, 1943.